US007613657B2

(12) United States Patent
Cesarini

(10) Patent No.: US 7,613,657 B2
(45) Date of Patent: Nov. 3, 2009

(54) REVERSE RATING SYSTEM FOR DETERMINING DURATION OF A USAGE TRANSACTION

(75) Inventor: Andrea Cesarini, Rome (IT)

(73) Assignee: Accenture Global Services GmbH, Schaffhausen (CH)

( * ) Notice: Subject to any disclaimer, the term of this patent is extended or adjusted under 35 U.S.C. 154(b) by 441 days.

(21) Appl. No.: 11/289,895

(22) Filed: Nov. 30, 2005

(65) Prior Publication Data

US 2007/0124154 A1 May 31, 2007

(30) Foreign Application Priority Data

Aug. 31, 2005 (EP) .................................. 05425610
Aug. 31, 2005 (IT) ......................... RM2005A0451

(51) Int. Cl.
*G06Q 99/00* (2006.01)
*H04M 15/00* (2006.01)
(52) U.S. Cl. ............................... 705/40; 379/111; 725/1
(58) Field of Classification Search .................... 705/35, 705/40, 400, 402, 409, 412; 379/111, 114, 379/121; 725/1–8
See application file for complete search history.

(56) References Cited

U.S. PATENT DOCUMENTS

| | | | |
|---|---|---|---|
| 5,923,741 A | 7/1999 | Wright et al. | |
| 6,182,054 B1 | 1/2001 | Dickinson et al. | |
| 6,199,047 B1 | 3/2001 | Dimino et al. | |
| 6,345,239 B1 | 2/2002 | Bowman-Amuah | |
| 2002/0102962 A1* | 8/2002 | Grinn et al. ................... 455/406 |
| 2002/0107754 A1 | 8/2002 | Stone | |
| 2002/0167909 A1* | 11/2002 | Balazinski et al. ........... 370/252 |
| 2003/0154136 A1* | 8/2003 | Bittmann et al. ............... 705/26 |
| 2004/0009762 A1* | 1/2004 | Bugiu et al. ................... 455/406 |
| 2004/0148237 A1* | 7/2004 | Bittmann et al. ............... 705/35 |
| 2005/0027624 A1* | 2/2005 | Cai .............................. 705/32 |
| 2005/0123111 A1* | 6/2005 | Philbin et al. ............. 379/114.2 |

FOREIGN PATENT DOCUMENTS

WO    WO 00/13402    3/2000

(Continued)

OTHER PUBLICATIONS

"Intec Launches Dynamic Charging Platform, Allowing Wireless Carriers to Deliver Advanced Network Services Against Pre-paid and Post-paid Billing Models", Business Wire, p. 5503, Jun. 23, 2003.*
Extended European Search Report, EP Pat. App. No. 05425610.2, Jan. 24, 2006.

(Continued)

*Primary Examiner*—Mary Cheung
(74) *Attorney, Agent, or Firm*—Brinks Hofer Gilson & Lione

(57) ABSTRACT

A reverse rating system determines the duration for which a phone call or other transaction may continue, given an account balance on a pre-paid customer account. The duration may take into consideration multiple time bands, applicable discounts, rating plans and other characteristics of the customer account and telecommunications service. The telecommunications service provider may employ the duration information to determine when to disconnect an ongoing transaction. As a result, the telecommunications service provider avoids substantial revenue loses from continuing to allow a pre-paid customer to continue their transaction longer than their account balance will support.

25 Claims, 11 Drawing Sheets

FOREIGN PATENT DOCUMENTS

| | | | |
|---|---|---|---|
| WO | WO 00/21273 | A2 | 4/2000 |
| WO | WO 00/21273 | A3 | 4/2000 |
| WO | WO 03/026268 | A2 | 3/2003 |
| WO | WO 03/026268 | A3 | 3/2003 |

OTHER PUBLICATIONS

European Examination Report, EP Pat. App. No. 05425610.2 Nov. 20, 2008.

* cited by examiner

| Reverse Rating NACK Response Message | | | | | | | 1100 |
|---|---|---|---|---|---|---|---|
| NACK | 1102 | Message ID | 1104 | Error Number | 1106 | Error Message | 1108 |

Figure 11

| Reverse Rating REJECT Response Message | | | | | | | 1200 |
|---|---|---|---|---|---|---|---|
| REJECT | 1202 | Message ID | 1204 | Error Number | 1206 | Error Message | 1208 |

Figure 12

Reverse Rating BALANCE Response Message     1300

| BALANCE 1302 | Message ID 1304 | Event Type 1306 |
|---|---|---|
| Event Source 1308 | Balance 1310 | Balance Time 1312 |

Figure 13

Reverse Rating POST Response Message     1400

| POST 1402 | Message ID 1404 | Event Type 1406 | Event Source 1408 |
|---|---|---|---|

Figure 14

REVERSE RATING SYSTEM FOR DETERMINING DURATION OF A USAGE TRANSACTION

BACKGROUND OF THE INVENTION

1. Priority Claim

This application claims the priority benefit of EPO Application No. 05425610.2 filed Aug. 31, 2005, and Italian Application No. RM2005A00451 filed Aug. 31, 2005, both of which are incorporated herein by reference in their entirety.

2. Technical Field

This invention relates to telecommunications processing systems. In particular, this invention relates to accurately and efficiently determining a maximum duration of a service use transaction, such as the maximum time allowed for a cellular phone call.

3. Related Art

Rapid advances in data processing and telecommunications technology have lead to a vast array of communication services available to the consumer. Such telecommunication services include Internet service, cable television service, cellular phone service, paging service, combined voice and data delivery service, and many other services. Furthermore, most services may be wireless or wireline based.

With the increase in available services has also come increased flexibility in paying for those services. Traditionally, most customer accounts were post-paid accounts. For post-paid accounts, the service provider tracked all of the time a customer spent using a service, determined the applicable cost, and billed the customer (e.g., monthly). In other words, the customer paid only after using the service.

More recently, pre-paid accounts have become a viable option for paying for telecommunications services. For a pre-paid account, a customer makes an initial payment to the service provider which establishes a credit balance with the service provider. The customer may then use the telecommunications service until the credit balance is exhausted, with accounting performed after the termination of each service use transaction.

Allowing the customer to continue a service use transaction beyond what the credit balance will support means that the service provider loses revenue. When multiplied against the significant and steadily increasing number of pre-paid accounts, continued service beyond what a credit balance will support significantly compounds the revenue loss for the service provider. Nevertheless, in the past, service providers did not have an accurate or efficient mechanism for determining how long a pre-paid account balance would pay for a proposed service transaction, such as a cellular phone call.

Implementing enhanced performance techniques for pre-paid accounts poses significant technical challenges, however. One such challenge is efficiently and accurately determining the maximum duration available for a desired service. This is a particularly difficult technical challenge, given that hundreds or thousands of ongoing pre-paid service use transactions may be simultaneously occurring at any given time, and given that many different time rates, discounts, and rating schedules may be in place over a wide range of products and services.

SUMMARY

One aspect of the invention is a method for reverse rating a service use transaction. The service use transaction may be a cellular phone call, Internet browsing session, wireless data transmission, or other transaction. The method includes receiving a service use request message for a proposed service use transaction. A mediation system then responsively communicates a reverse rating request for the proposed service use transaction to a reverse rating system. In one implementation, the reverse rating system receives the reverse rating request at a dedicated socket and implements multithreading processing of multiple reverse rating requests.

The method also obtains a source identifier from the reverse rating message. The source identifier may be a phone number, International Mobile Subscriber Identity (IMSI) number, or other identifier of a customer requesting the service use transaction. A determination may be made about whether a customer account exists for the source identifier. When the customer account does not exist, the method initiates transmission of a no-account rejection response. In other words, the proposed service use transaction is not authorized.

However, when the customer account does exist, the reverse rating system performs a reverse rating on the proposed service use transaction. The reverse rating may take into account multiple time bands, multiple time rates, multiple discounts, and other characteristics of the proposed service use transaction, the customer account, rating plans, or other service use transaction characteristics. The reverse rating may be a maximal service use duration (i.e., the maximum duration for a transaction supported by an initial customer account balance).

In one implementation, the reverse rating system determines the reverse rating by determining multiple partial service use durations. Each partial service use duration may cover a different time band and may be recursively determined based on previously determined partial service use durations. Each multiple partial service use duration contributes to a sum. The sum accumulates as the reverse rating of the service use transaction.

The method also determines an initial account balance for the customer account. If the account balance is below a service threshold, the reverse rating system may initiate transmission of a no-balance rejection response. Otherwise, the reverse rating system maintains the current account balance while determining the multiple partial service use durations. When the current account balance falls below a balance threshold, the reverse rating system returns the sum as a maximal duration of the service use transaction.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 11 shows a reverse rating NACK response message.

FIG. 12 illustrates a reverse rating REJECT response message.

FIG. 13 shows a reverse rating BALANCE response message.

FIG. 14 shows a reverse rating POST response message.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the reverse rating systems and method may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the reverse rating system will be described, methods, systems, and articles of manufacture consistent with the reverse rating system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

Figure 1:
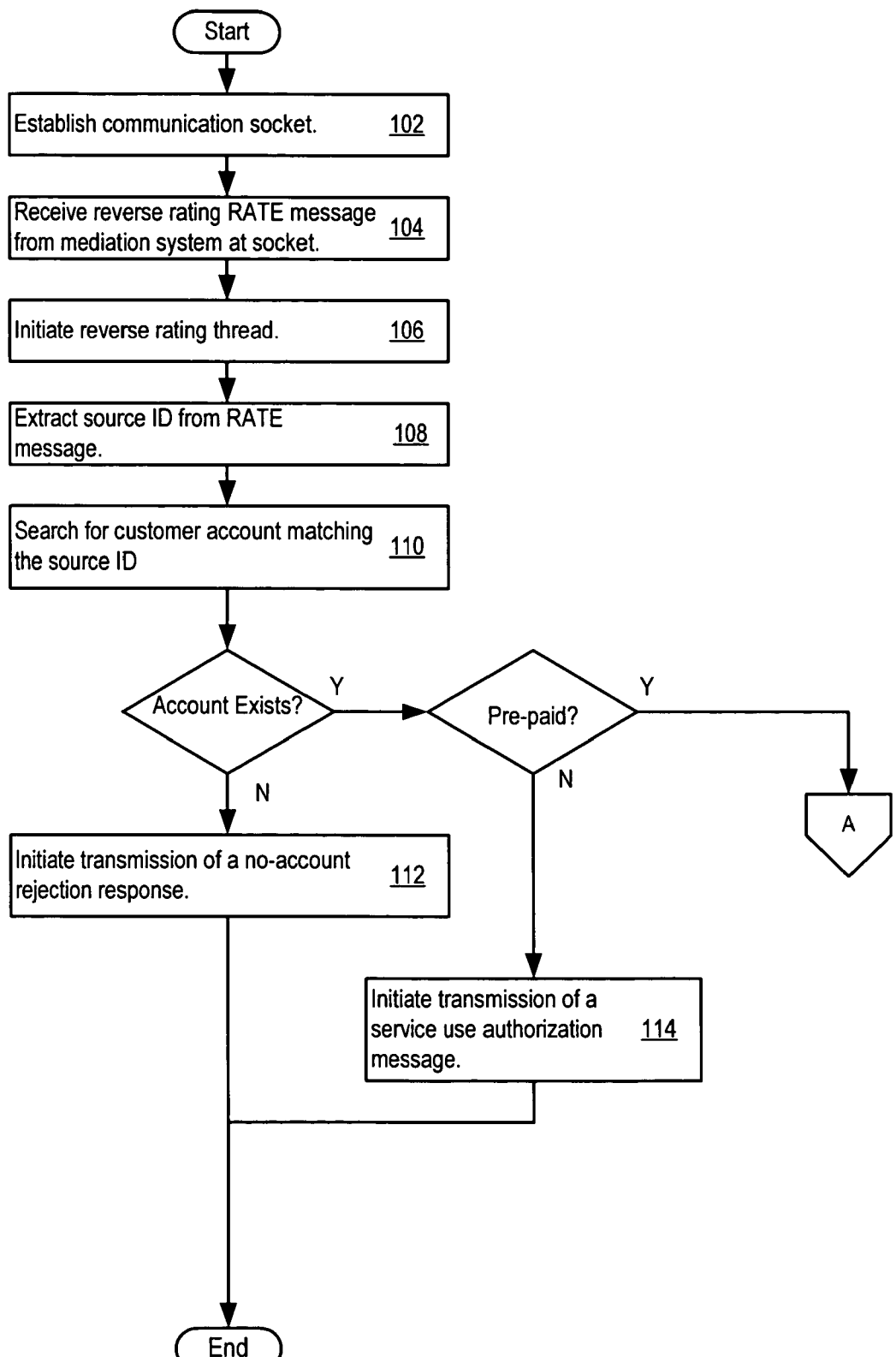
FIG. 1 shows acts that a reverse rating program and/or a reverse rating system may take to determine a maximal duration of a service use transaction.

FIG. 1 shows acts 100 that a reverse rating program running in a reverse rating system may take to determine a maximal duration of a service use transaction. In general, the reverse rating program starts with an account balance, and determines a service use duration supported by the account balance. The service use duration may be the duration of a wireline or cellular phone call, an Internet connectivity (e.g., browsing) session, Internet Protocol Television (IPTV) reception, Voice over Internet Protocol (VoIP) session, or the duration of any other proposed telecommunications service transaction. By determining a service use duration, the telecommunications service provider may terminate a service use transaction when the customer account balance is depleted. The service provider thereby avoids monetary losses stemming from providing service to a pre-paid customer beyond the duration which the account balance actually supports.

In FIG. 1, the reverse rating system establishes a communications socket (Act 102) supported by a communications protocol such as the Transmission Control Protocol (TCP), User Datagram Protocol (UDP) or other protocol. To that end, for example, the reverse rating system may select an Internet Protocol (IP) address, a port number, and/or a protocol to define the socket. The reserve rating system may then listen on the socket for reverse rating request messages, such as the reverse rating REQUEST message, the reverse rating RATE message, and/or other messages. However, the reverse rating system may obtain reverse rating request messages in other ways, such as through interprocess communication, signaling, remote procedure calls, or in other manners using Unix domain sockets, IPC sockets, or other communication mechanisms.

The reverse rating system, listening on the socket, receives a reverse rating RATE messages (Act 104). The RATE messages may arrive from a mediation system (or other telecommunications support system) which initially receives a service use request from a customer. The mediation system, before authorizing the service use transaction, communicates the RATE message to the reverse rating system to determine the maximal duration of the use transaction, given the customer account balance.

There may be many hundreds or thousands of customers who are attempting to initiate a service use transaction at any given time. Accordingly, in one implementation, the reverse rating system implements multi-threaded execution of reverse rating programs, each handling one or more rate requests. As shown in FIG. 1, the reverse rating system initiates a reverse rating thread in response to receiving the RATE message from the mediation system (Act 106).

The RATE message, as will be explained in more detail below, may include a source identifier. The source identifier may provide an identifier of the customer who is initiating the service use request. The rating system extracts the source identifier from the RATE message (Act 108). In one implementation, the source identifier is an International Mobile Subscriber Identity (IMSI) identifier. The IMSI number provides a unique 15-digit code that is attached to every SIM (Subscriber Identification Module) card. The IMSI number allows the telecommunications service provider to identify the subscriber, their home country and network, and other subscriber characteristics. Other identifiers may be employed, however.

After obtaining the source identifier, the reverse rating system searches for a customer account matching the source identifier (Act 110). The reverse rating system may, for example, initiate a billing system database search based on the source identifier, may initiate a local database search, or may perform the search in other manners and/or with other entities. Accordingly, the reverse rating system obtains an indication of whether a customer account exists for the source identifier.

If no customer account exists for the source identifier, the reverse rating system initiates transmission of a no-account rejection response (Act 112). The reverse rating system may send the rejection response back to the mediation system (or other support system) which originated the RATE message. The mediation system may then deny the service use request based on the rejection response.

On the other hand, the reverse rating system may determine that a customer account exists for the source identifier. In that case, the reverse rating system may then determine whether the customer account is a pre-paid account or a post-paid account. The reverse rating system may make this determination based a data field in a customer account record returned in the search for the customer account, based on a message sent from a billing system or other system, or in other manners.

If the customer account is a post-paid account, the reverse rating system initiates transmission of a service use authorization response message (Act 114). Because the customer account is post-paid, the customer is billed periodically (e.g., monthly) for the cost of the services provided to the customer. Thus, the reverse rating system does not determine how long a requested service use may continue. Instead, the reverse rating system initiates transmission of an authorization message, and the customer will be billed later. However, if the customer account is a pre-paid account, the reverse rating system determines a use transaction duration supported by the current pre-paid customer account balance.

Figure 2:
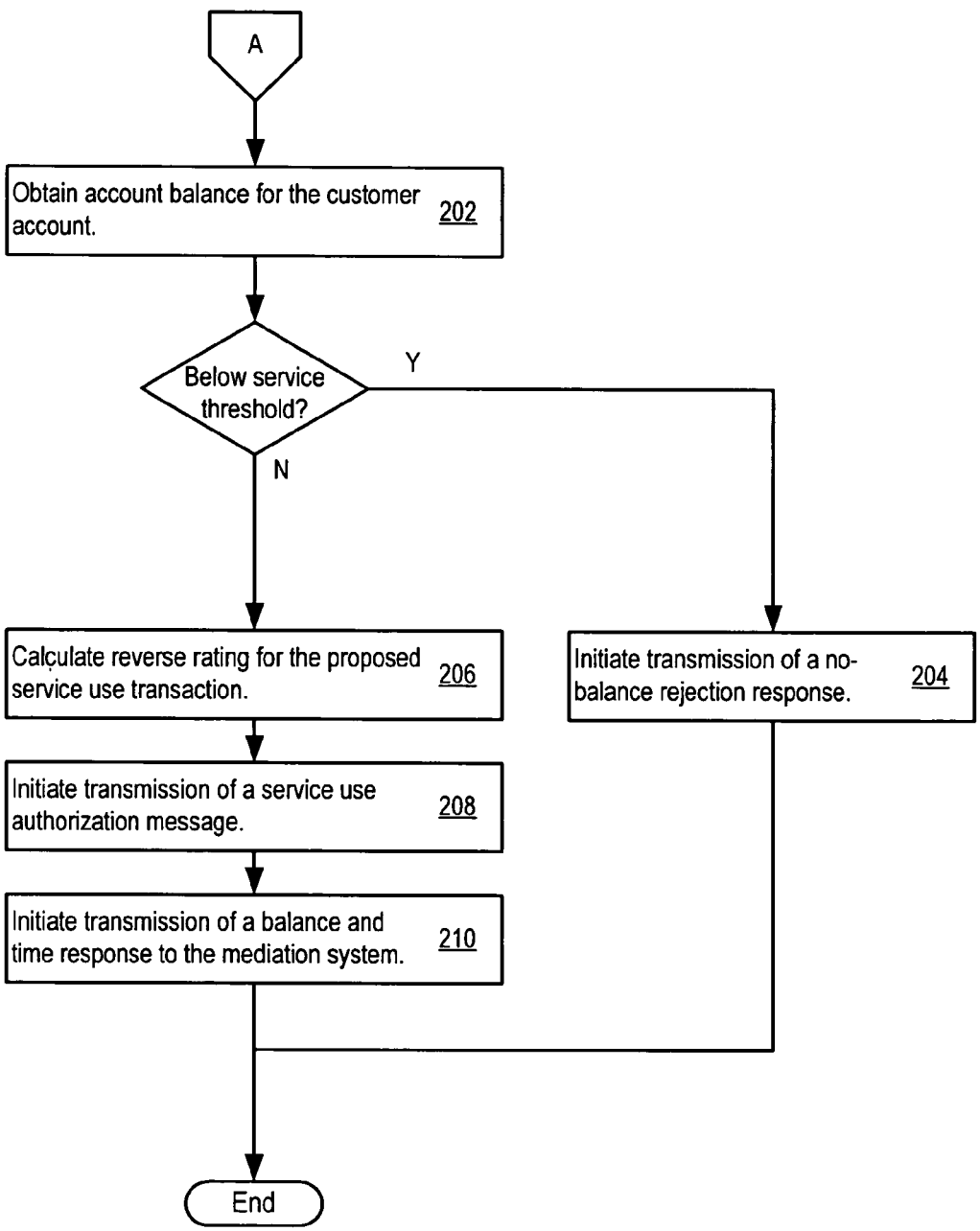
FIG. 2 shows acts that a reverse rating program and/or a reverse rating system may take to determine a maximal duration of a service use transaction.

FIG. 2 is a continuation of FIG. 1 and shows additional acts 200 that the reverse rating program may take to determine the use transaction duration. Although the customer may have an account, and may be a pre-paid customer, the customer account balance may be too low to support the desired service use transaction. Accordingly, the reverse rating system obtains the account balance for the customer account (Act 202).

If the account balance is too low, the reverse rating system initiates transmission of a no-balance rejection response (Act 204). For example, the customer may have depleted their pre-paid account. Thus, if their account balance is less than or equal to $0.00, the reverse rating system may initiate transmission of the no-balance rejection response. In general, the reverse rating system may establish a service threshold below which a service use transaction will not be authorized for the pre-paid customer. The service threshold may lie in the range of –$1.00 to –$0.50, –$0.50 to $0.00, $0.00 to $0.50, $0.00 to $1.00, or may be set at another level. The service threshold may depend on the customer, the proposed service use transaction, the time or date, or other telecommunication product or service factors.

On the other hand, when the pre-paid customer has sufficient funds in their account, the reverse rating system proceeds to calculate a reverse rating (Act 206). The reverse rating may be a maximal service use transaction duration supported by the customer account balance. The reverse rating may be expressed in terms of minutes and seconds of service use supported by the pre-paid customer account balance. As will be explained in more detail below, the reverse rating may also be an approximation to, or estimate of, the maximal service use transaction duration supported by the customer account.

After determining the reverse rating, the reverse rating system initiates transmission of a service use authorization message (Act 208). The authorization message may be sent from the reverse rating system to the mediation system, or to another supporting processing system. The authorization message may include an authorization code which indicates that the service use transaction is approved. In addition, the reverse rating system initiates transmission of a reverse rating response message (Act 210). The reverse rating response may include the reverse rating previously determined. Alternatively, the service use authorization message and balance and time response message may be combined into a single authorization response message.

Figure 3:
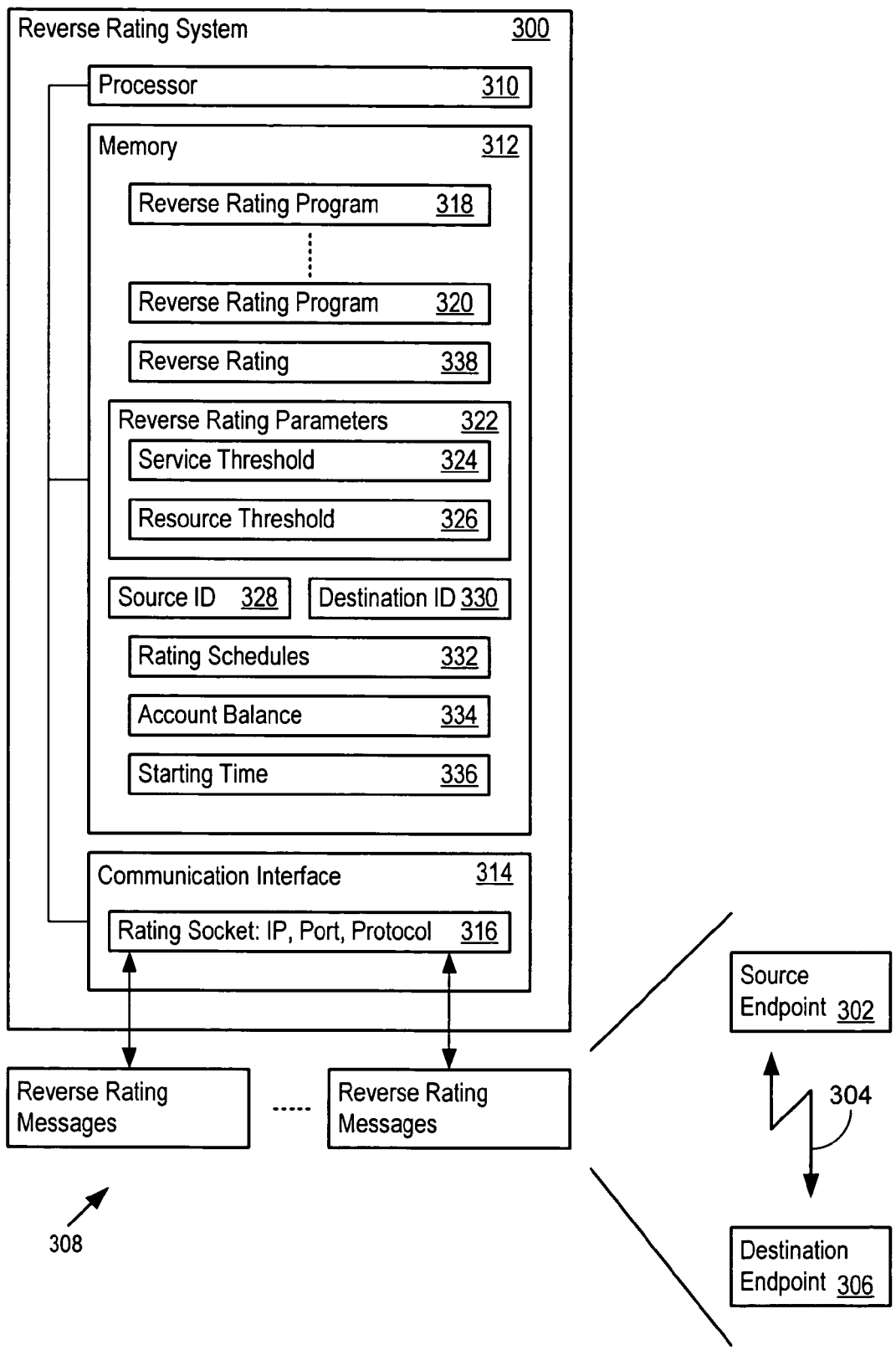
FIG. 3 shows a reverse rating system which may determine a reverse rating for a proposed service use transaction.

FIG. 3 shows a reverse rating system 300 which may determine a reverse rating for a proposed service use transaction. As shown in FIG. 3, a source endpoint 302 proposes to establish a service use transaction 304 (e.g., a cellular phone call) with a destination endpoint 306. The endpoints 302 and 306 may represent customers, automated processes, programs, or other entities between which a telecommunications service may be established. For example, the proposed service use transaction 304 may be an instant messaging exchange between two individuals. As another example, the service use transaction 304 may be an Internet browsing session between an individual and an Internet service provider.

In response to the proposed service use transaction 304, and other service use transactions, external mediation systems transmit and receive reverse rating messages 308 to and from the reverse rating system 300. The reverse rating messages 308 may include reverse rating RATE messages, REQUEST messages, NACK response messages, REJECT response messages, BALANCE messages, POST messages, and/or other reverse rating messages described below. The messages convey the request for the service use transaction to the reverse rating system 300 and return a reverse rating, authorization, or error message to the mediation system.

The reverse rating system 300 includes a processor 310, a memory 312, and a communication interface 314. The communication interface 314 provides a network connection for the reverse rating system 300. In connection with a selected communication protocol (e.g., TCP/IP), the reverse rating system 300 may establish one or more rating sockets 316. The rating sockets 316 may be defined by a network address, such as an Internet Protocol (IP) address, a port number, and a protocol (e.g., TCP).

The reverse rating request messages, including the REQUEST and RATE messages arrive at the rating socket 314 and are processed by the reverse rating system 300. The reverse rating system 300 responds with reverse rating response messages to the originator of the REQUEST and RATE messages or to other telecommunications support systems. In one implementation, the reverse rating system 300 implements multi-threaded processing of the reverse rating requests. Accordingly, the reverse rating system 300 may simultaneously process multiple reverse rating requests for many proposed service use transactions.

In the reverse rating system 300, the memory 312 includes multiple reverse rating programs (e.g., the reverse rating programs 318 and 320). Each program 318 and 320 may correspond to a reverse rating thread operating to determine a reverse rating for a different proposed service use transaction. In other implementations, however, the reverse rating system 300 may process the reverse rating requests in other manners, such as by queueing and sequentially processing each request. The reverse rating programs 318 and 320 may be implemented as iterative or recursive programs.

The memory also stores reverse rating parameters 322. The reverse rating parameters 322 may configure the operation of the reverse rating programs 318 and 320 and/or the reverse rating system 300. As examples, the reverse rating parameters 322 include a service threshold parameter 324 and a resource threshold parameter 326. The service threshold parameter 324 may establish a minimum balance which a customer account must meet before the reverse rating system 300 authorizes a service use transaction (e.g., $0.25).

The resource threshold parameter 326 may establish a maximum resource expenditure for processing each reverse rating request. For example, the resource threshold parameter 326 may establish a processor time threshold (e.g., 20 ms), a clock time threshold (e.g., 5 seconds), a recursion or iteration limit on determining partial duration results, or another threshold. When a reverse rating program exceeds the resource threshold established by the resource threshold parameter 326, the reverse rating program may terminate and return a reverse rating which was determined up to the point of termination. The reverse rating may be an approximation to the maximal duration of the service use transaction supported by the current customer account balance.

The memory 312 stores additional parameters as well. In particular, the memory 312 may store, for each proposed service use transaction, a source identifier 328, a destination identifier 330, and rating schedules 332. Additionally, the memory 312 may store an account balance 334, a starting time/date 336, or any other data characterizing a service event. The service event data may arrive in a reverse rating request message.

The source identifier 328 may uniquely identify the source endpoint 302. For example the source identifier 328 may be an IMSI number assigned by the telecommunications infrastructure. Similarly the destination identifier 330 may uniquely identify the destination endpoint 306. The source identifier 328 and the destination identifier 330 may provide search keys which the reverse rating system 300 may use to search for customer accounts linked to, or associated with, the source identifier 328 and/or the destination identifier 330.

The starting time 336 represents the time and date at which the proposed service use transaction will begin. The account balance 334 provides the account balance for the customer associated with the source identifier 328. The reverse rating system 330 may obtain the account balance 334 by querying an external billing system, by receiving the account balance in a message from an external system, or in other manners.

The rating schedules 332 establish time rates and the times and dates (or ranges of times and dates) during which the time rates are applicable. For example, the rating schedules 332 may indicate that a cellular phone call costs $0.10/min on weekdays between 9 a.m. and 5 p.m. and costs $0.05/min at all other times on weekdays. The rating schedules 332 may also indicate that a cellular phone call is free on Sunday but costs $0.50/min on Saturday. As another example, the rating schedules 332 may indicate that the cost of maintaining an Internet connection is $0.20/min any day between 9 a.m. and 7 p.m. and $0.40/min at any other time.

The rating schedules 332 may take into consideration any characteristic of the proposed service use transaction 304, the source endpoint 302, and the destination endpoint 306. The characteristics, for example, may include whether the proposed service use transaction 304 is a local connection, a long-distance connection, an international connection, or any other characteristic. Additional examples of characteristics which may impact the rating schedules 332 include the requested bandwidth for the service use transaction 304, the nature of the service use transaction 304 (e.g., a voice connection, a combined voice and data connection, or a data only connection), the product and services delivered over the connection (e.g., Voice over IP, or IP Television), or any other characteristic.

The reverse rating system 300 begins with an initial account balance and a starting time for the proposed service use transaction. From these parameters, the reverse rating system 300 determines how long the proposed service use transaction may continue before the account balance is depleted. The resulting reverse rating 338 informs other support systems in the telecommunications system, which may automatically disconnect the customer when the duration has expired. Alternatively or additionally, the reverse rating may be provided to customer so that the customer is informed of how long the desired service use transaction may continue. In the examples explained below, the reverse rating program 318 determines the reverse rating for proposed cellular phone call between two customers, starting on a Saturday afternoon at 3 p.m.

Figure 4:
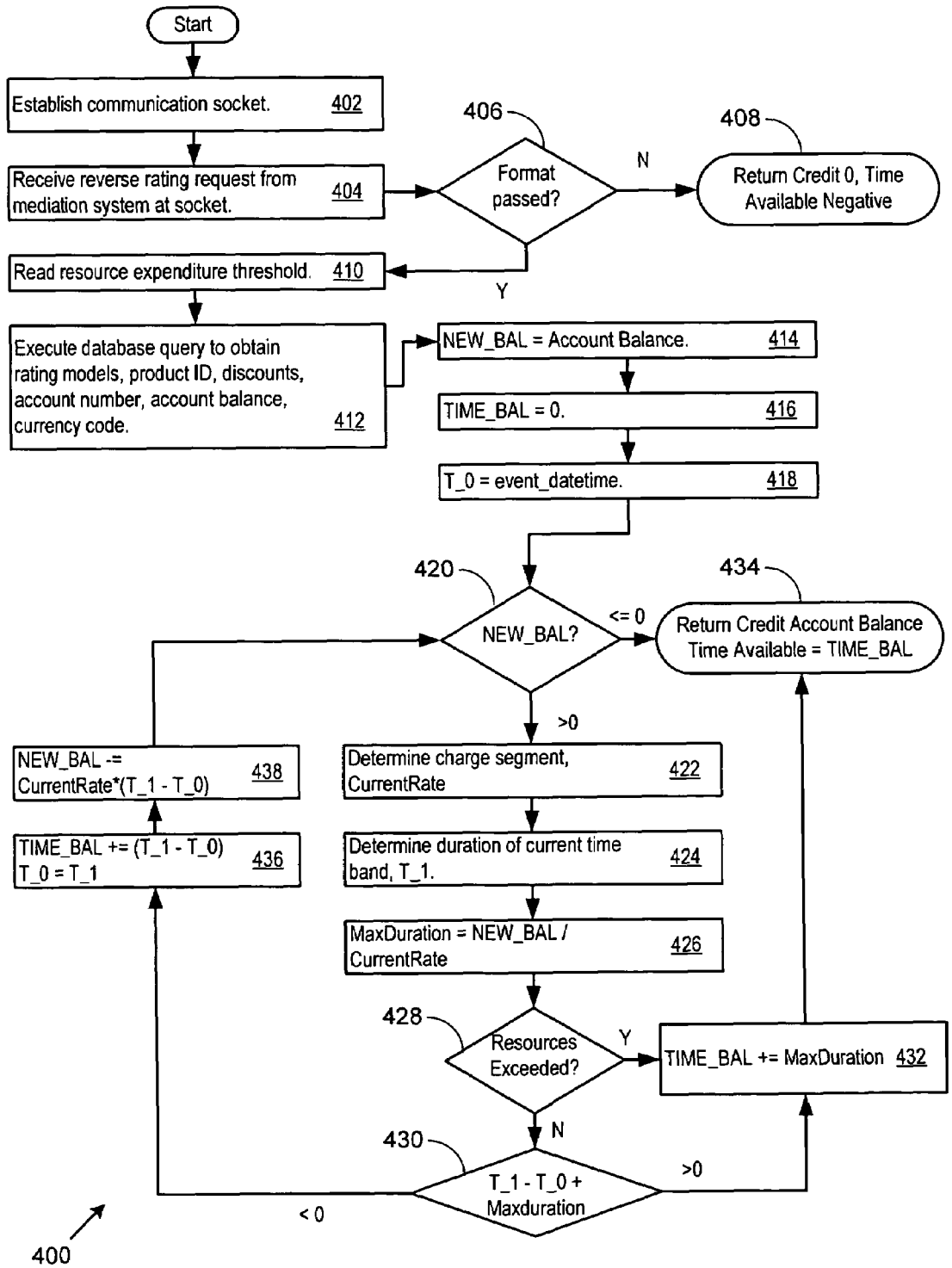
FIG. 4 shows acts that a reverse rating program and/or a reverse rating system may take to determine a maximal duration of a service use transaction.

FIG. 4 shows acts that the reverse rating program 318 and the reverse rating system 300 may take to determine the reverse rating, such as a maximal duration of a proposed service use transaction. Initially, the reverse rating system 300 establishes the reverse rating communications socket 316 (Act 402). Once the reverse rating socket 316 is established, the reverse rating program 318 listens on the socket 316 for reverse rating request messages. The reverse rating program 318 receives the reverse rating request messages that arrive at socket 316 (Act 404).

The reverse rating program 318 executes an initial check of each reverse rating request message. For example, the reverse rating program 318 may determine whether the format of the reverse rating request message meets an expected format (Act 406). In other words, the reverse rating program 318 may check for badly formed rating request messages, messages missing expected parameters, or messages which cannot otherwise be processed. When a reverse rating request message arrives that does not pass the format check, the reverse rating program 318 may initiate transmission of a rejection or error response message (Act 408). The rejection response may report that the available account balance is zero, that the maximum duration of the service use transaction is zero or negative, and/or may include fields or flags which indicate that the reverse rating request message could not be parsed or processed.

If the reverse rating request message passes the format check, the reverse rating program 318 may then read or set a resource expenditure threshold parameter 326 (Act 410). As noted above, the expenditure threshold parameter 326 may set a limit on the expenditure of resources consumed to determine the reverse rating for the proposed service to use transaction. The resource expenditure threshold 326 may be expressed in terms of CPU time, clock time, program iterations, or in other terms.

The reverse rating program 318 next obtains parameters for determining the reverse rating (Act 412). In one implementation, the reverse rating program 318 executes a database query to obtain rating models, product identifiers, discounts or other modifiers for the time rates, initial customer account balances, the applicable currency in which the account balance is expressed, and other characteristics of the customer account and/or the proposed service use transaction. The reverse rating program 318 may obtain the parameters from a billing system, the customer accounting system, a customer care system, a mediation or from other systems. Alternatively or additionally, the reverse rating program 318 may receive the parameters in messages sent from the billing system, the customer account system, the customer care system, the mediation system, or other systems.

Next, the reverse rating program 318 initializes parameters which assist in the determination of the reverse rating. As shown in FIG. 4, reverse rating program 318 sets the new balance parameter to the initial customer account balance (Act 414), sets the current time balance to zero (Act 416), and sets the current time parameter to the current time and date (Act 418).

As will be explained in more detail below, the reverse rating program 318 takes into consideration multiple different time bands and applicable time rates for the time bands, while tracking the remaining account balance. More specifically, the reverse rating program 318 checks to see whether the remaining account balance stored in the new balance parameter remains positive (Act 420). While the remaining account balance is positive, the reverse rating program determines the applicable time rate for the current time and date (Act 422). For example, the reverse rating program 318 may determine that the cellular phone call is beginning all on Saturday afternoon at 3 p.m., and that the applicable time rate is $0.20/minute for this customer at this date and time.

In determining the current time rate, the reverse rating program 318 may also take into consideration discounts or cost increases. To that end, the reverse rating program 318 may adjust the time rate to reflect, for example, a discount given to customer. The reverse rating program 318 may obtain any applicable discounts in the billing system or any other system in communication with the telecommunications service provider. The discounts or cost increases may change from time band to time band and may further depend on the source identifier, the destination identifier, characteristics of the proposed service use transaction, customer account, or other characteristics.

In addition, the reverse rating program 318 also determines the duration of the current time band (Act 424). Each time band is bounded by a start time and/or date and end time and/or date during which a time rate stays the same. For example, given that the applicable time rate is currently $0.20/min, the reverse rating program 318 determines the time and date at which the time rates changes. Assuming, for example, that the time rate increases to $0.50/min at 5 p.m. on Saturday afternoon, then the duration of the current time band is two hours or 120 minutes.

Given the current time rate and the current customer balance, the reverse rating program 318 begins to determine the maximum duration for the proposed service use transaction. The reverse rating program 318 divides the current time rate into the existing customer balance to determine the maximum duration (Act 426). Note, however, that the maximum duration may extend beyond the duration of the current time band. The reverse rating program 318 considers extensions across time bands as will be explained in more detail below.

The reverse rating program 318 also determines whether the resources expended thus far exceed the resource expenditure threshold 326 previously set (Act 428). If the resources which have been spent her still under the resource expenditure threshold 326, the reverse rating program 318 next determines whether the maximum duration extends beyond the duration of the current time band (Act 430).

In one implementation, the reverse rating program 318 makes this determination by subtracting, from the end of the current time band, the current time plus the maximum duration of the service use transaction. For example, if the current time is Saturday afternoon at 3 p.m. and the maximum duration at the current time rate is one hour, then the current customer account balance pays for the cellular call until 4 p.m., with one hour to spare before the next time rate change at 5 p.m. Saturday afternoon.

When the maximum duration remains within the current time band (or when expended resources exceed the threshold), the reverse rating program 318 increments the current time balance by the maximum duration (Act 432). The reverse rating program 318 then returns a service use authorization message (Act 434) and terminates. The service use authorization message includes the determined time balance supported by the customer account balance. Optionally, the reverse rating program 318 may also send a credit account balance message which indicates an initial customer account balance and/or that the customer account balance would be reduced to zero if the service use transaction persists for the time balance indicated in the authorization message.

In general, the reverse rating program 318 maintains a running sum of partial service use durations. Each partial service use duration may correspond to the duration or a part of a duration of the time band. As the customer account balance carries the service use duration across different time bands with different applicable time rates, the reverse rating program adds each partial service use duration into the sum.

For example, assuming that the maximum duration for the cellular phone call is three hours, then the reverse rating program 318 determines a first partial service use duration of two hours. These two hours extend from the start of the current time band at 3 p.m. Saturday afternoon to the end of the current time band at 5 p.m. Saturday afternoon when the time rate changes. However, the customer account balance is not exhausted at 5 p.m. Saturday afternoon. Accordingly the reverse rating program 318 takes into consideration the next applicable time band and time rates and continues determining the maximal service use duration supported by the customer account balance.

Specifically, as shown in FIG. 4, the reverse rating program 318 determines when the maximum duration extends beyond the duration of the current time band (Act 430). In the example above, the maximum duration extends the service use transaction to 6 p.m. on Saturday afternoon, beyond the duration of the current time band. Accordingly, the reverse rating program 318 increments the current time balance by the remaining duration of the current time band, and adjusts the starting time of the current time band to the ending time of the current time band (Act 436). For example, the reverse rating program 318 increments the current time balance by two hours, and sets the beginning of the current time band to 5 p.m. Saturday afternoon.

In addition, the reverse rating program 318 accounts for the cost of supporting the service use in the current time band (Act 438). As shown in FIG. 4, the reverse rating program 318 decrements the current customer account balance by the current time rate multiplied by the duration of the current time band. The current customer account balance therefore decreases accordingly.

The flow of the reverse rating program 318 then returns to determining whether the current customer account balance is greater than zero. If the current customer account balance has been exhausted, the reverse rating program 318 returns and authorization message including the running sum of the partial service use durations (Act 434). On the other hand, if the current customer account balance is greater than zero then the service use transaction may continue into or cross the next time band.

In that case, the reverse rating program 318 continues by determining the next applicable time rate, the duration of the next time band, and the maximum duration allowed by the current customer account balance and the next applicable time rate (Acts 422-426). Processing continues by determining one or more additional partial service use durations and maintaining their running sum, until the customer account balance is exhausted. When the reverse rating program 318 continues until the current customer account balance is exhausted, then the running sum represents the maximal service use duration for the post service use transaction. Otherwise, the running sum represents an approximation to the maximal service use duration, with an accuracy determined by the cap on the expenditure of processing resources.

Figure 5:
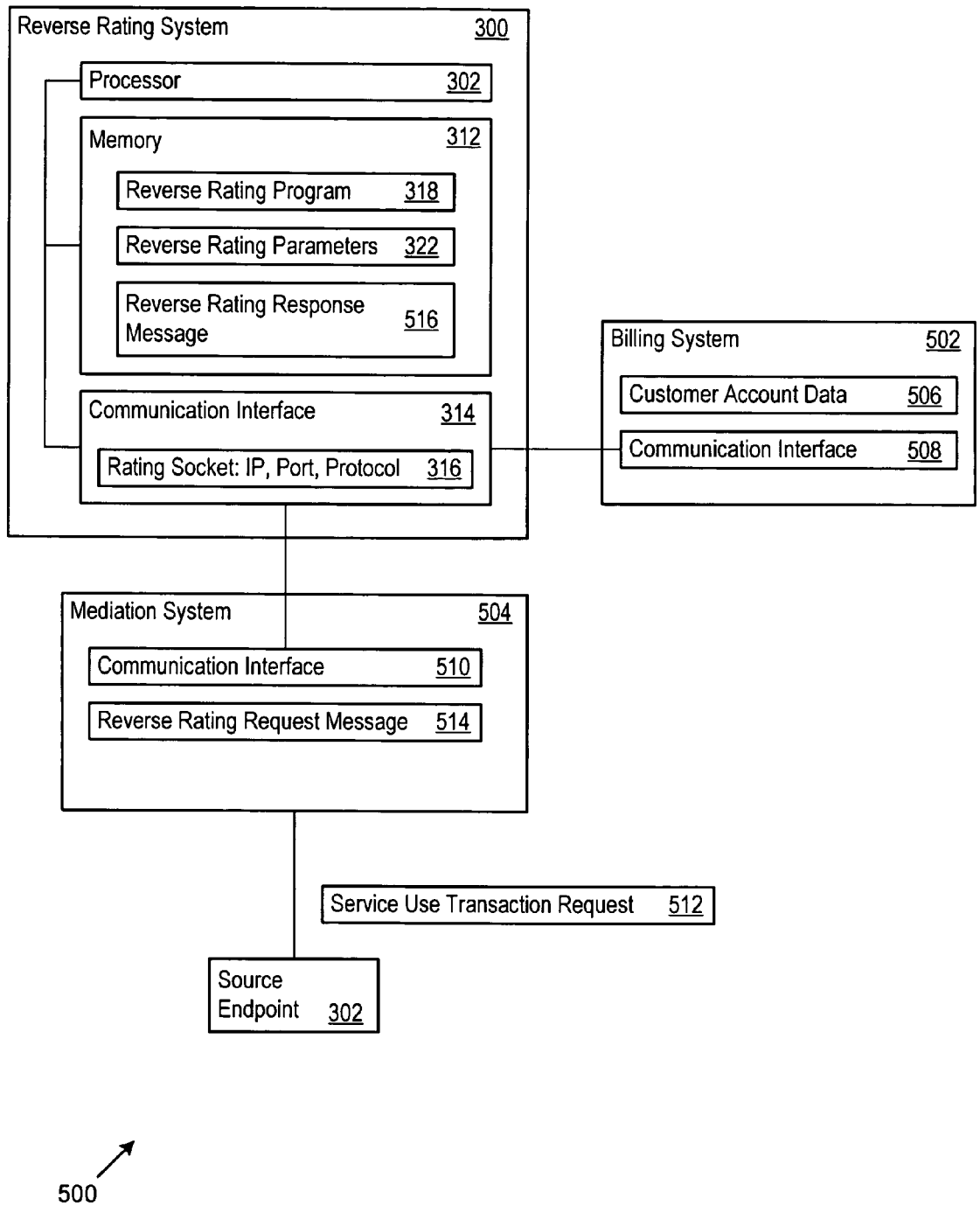
FIG. 5 shows a telecommunications system which includes a reverse rating system.

FIG. 5 shows a telecommunications system 500 which includes a reverse rating system 300, a billing system 502, and a mediation system 504. The telecommunications system 500 may include additional support systems such as a customer care system or a provisioning system. The billing system 502 includes customer account data 506 as well as a communication interface 508 for communicating with the reverse rating system 300 and the mediation system 504. The mediation system 504 also includes a communication interface 510 for communicating with the reverse rating system 300 and billing system 502.

The reverse rating system 300 may communicate with the billing system 502 to obtain parameters for determining a reverse rating for a proposed service use transaction. As an example, the reverse rating system 300 may obtain customer account balance data from the billing system 502.

As shown in FIG. 5, the source endpoint 302 interacts with mediation system 504. In particular the source endpoint 302 may communicate a service use transaction request 512 to the mediation system 504. The service use transaction request 512 may specify to the mediation system resource identifier for the source endpoint, a destination identifier, or other characteristics of the service use transaction desired by the source endpoint 302.

In response, the mediation system 504 prepares and communicates the reverse rating request messages 514 to the reverse rating system 300. The reverse rating system 300 receives the reverse request rating messages 514 and processes them as described in more detail below. The reverse rating system 300 also responds to the mediation system 504 with the reverse rating response messages 516.

Upon receipt of the reverse rating response messages 516, the mediation system 502 may communicate with the source endpoint 302. For example, the mediation system 502 may communicate the reverse rating to the source endpoint 302 for informational purposes. Alternatively or additionally, the mediation system 502 may communicate a service use transaction authorization or denial message to the source endpoint 302. Furthermore, the mediation system 502 may monitor the duration of any authorized service use transaction against the reverse rating determined by the reverse rating system 300. Accordingly, when an ongoing service use transaction reaches the reverse rating duration limit, the mediation system 504 may terminate the service use transaction. In addition, regardless of when the service use transaction ends, the mediation system 504 may communicate with the billing system 502 to indicate the duration of the service use transaction so that the customer account balance may be updated.

Figure 6:
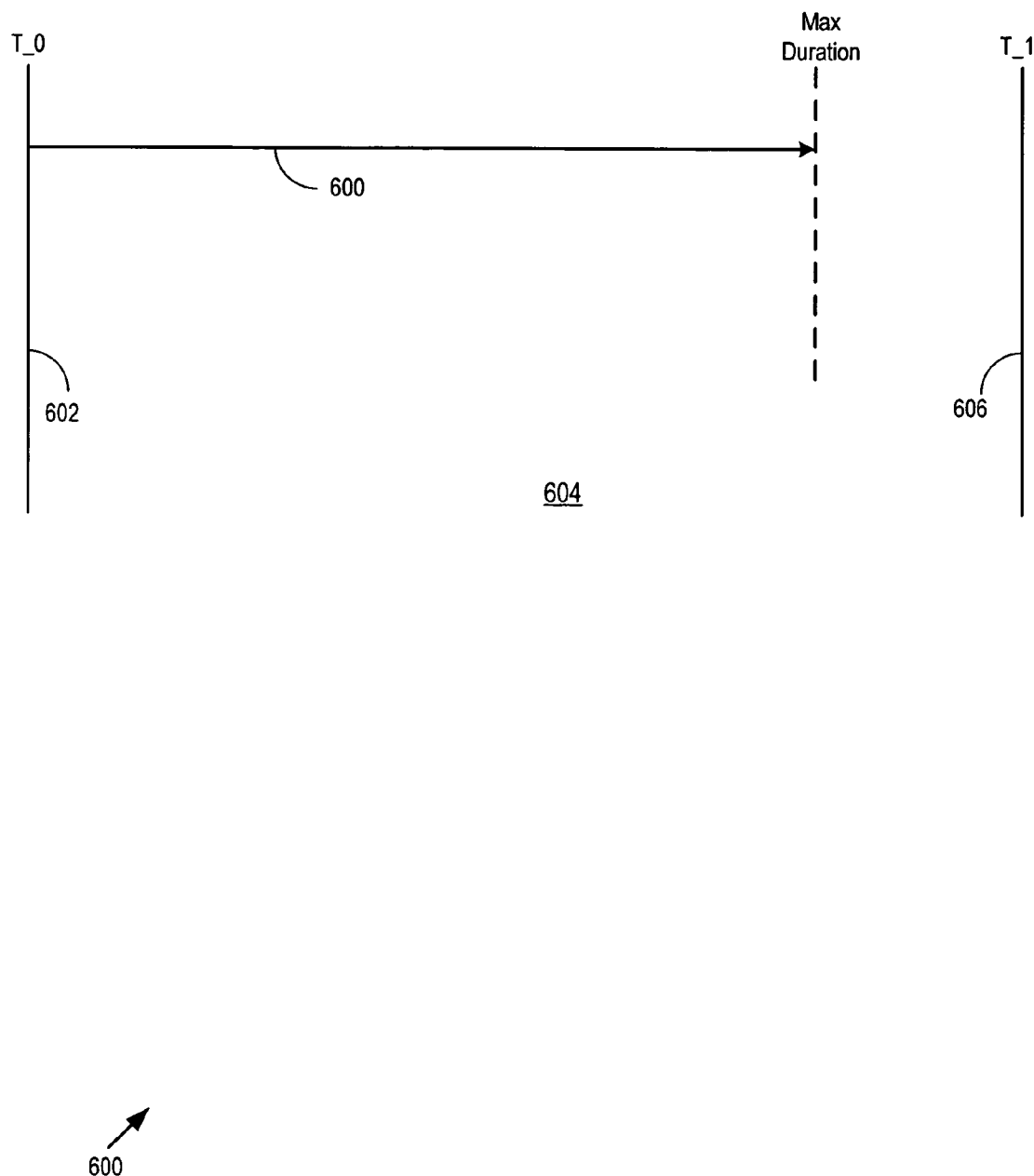
FIG. 6 illustrates a determination of a maximal duration for a service use transaction.

FIG. 6 illustrates a determination of a maximal duration 600 for a service use transaction. In the example shown in FIG. 6, the proposed service use transaction begins at time T_0 602. At time T_0 602, the time rate is $0.10/min, the current customer account balance is $10.00, and the running time balance is zero minutes. As shown in FIG. 6, the current time band 604 extends between time T_0 602 and time T_1 606. For example, time T_0 602 may be 3 p.m. on Saturday afternoon, while time T_1 606 may be 5 p.m. on Saturday afternoon.

The reverse rating program 318 accordingly determines that the maximum duration is 100 minutes ($10.00/$0.10/min). Therefore, the first partial service use duration is the maximum duration 600, which extends between 3 p.m. on Saturday afternoon until 4:40 p.m. on Saturday afternoon (i.e., 100 minutes). Note that the maximum duration 600 does not extend into the next time band. Therefore the reverse rating program 318 adds the partial service use duration of 100 minutes to the running time balance sum, and returns a service use transaction authorization message with a maximal duration of 100 minutes.

Figure 7:
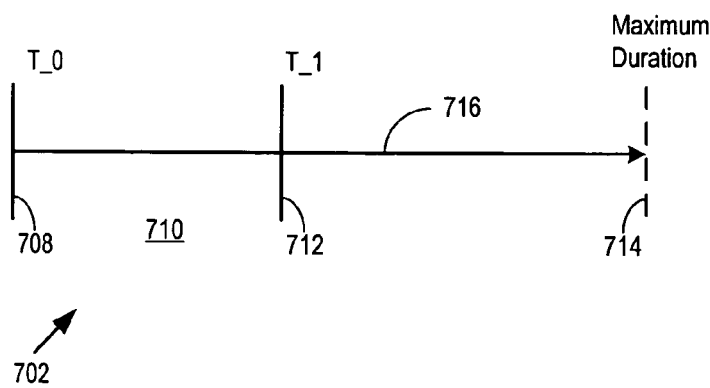
FIG. 7 shows a service use transaction divided across multiple time bands into partial service use durations.
Figure 7:
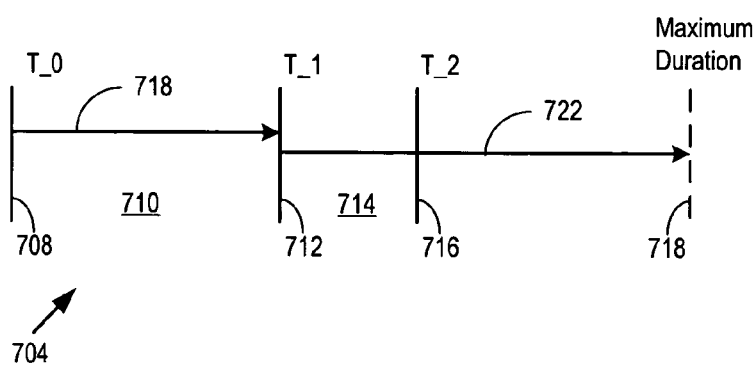
Figure 7:
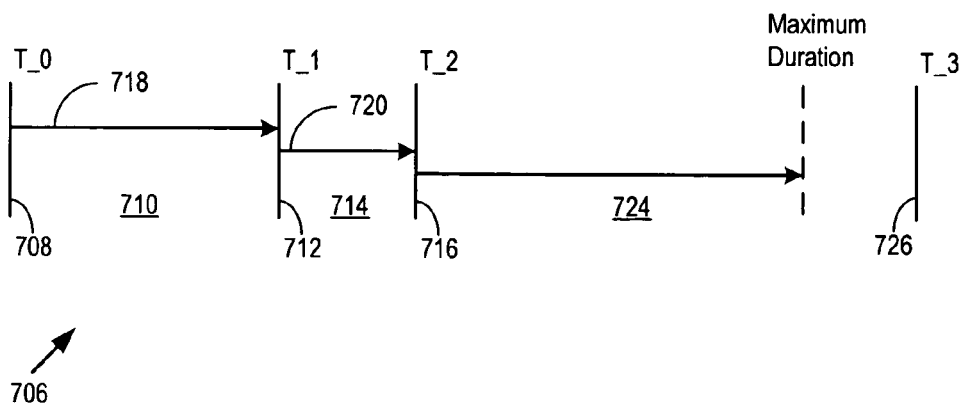

FIG. 7 shows a reverse rating determination divided into three stages 702, 704, and 706 across multiple time bands into partial service use durations. In the first stage 702, the proposed service use transaction begins at time T_0 708 (e.g., Saturday afternoon at 3 p.m.). The duration of the first time band 710 extends until time T_1 712 (e.g., Saturday afternoon at 5 p.m.).

The initial customer account balance of $50.00 supports a maximum service use duration 714 beyond the first time band 710. Calculated based on the initial customer account balance and current time rate for the first time band 710, the maximum duration 714 is 500 minutes. Thus, there is a remainder 716 (380 minutes) which extends beyond the end of the first time band T_1 712.

The reverse rating program 318 segments the maximum service use duration 714 into the first partial service use duration 718 and the remainder 716. The partial service use durations are generally consecutive and non-overlapping. After two hours of service use at $0.10/min, the customer account balance is reduced to $38.00, and the running time balance is incremented by the first partial service use duration 718 (i.e., 120 minutes). In the example shown in FIG. 7, the second time band 714 extends between time T_1 712 and time T_2 716. For the purposes of discussion below, it is assumed that time T_2 716 is 6:30 p.m. The second time band 714 is associated with a time rate of $0.25/min.

The reverse rating program 318 then determines a new maximum duration based on the remainder 716, the current customer account balance at time T_1 712, and the current time rate beginning at time T_1 712. The new maximum duration 718 is $38.00/$0.25/min=152 minutes. In other words, the maximum duration extends from 5 p.m. Saturday afternoon until 7:32 p.m. Saturday night.

The maximum duration 718 extends across the second time band 714, which ends at time T_2 716 (i.e., 6:30 p.m.). Accordingly, the reverse rating program 318 segments the maximum service use duration 718 into a second partial service use duration 720 and a remainder 722 (62 minutes). After 90 minutes of service at $0.25/min, the customer account balance is reduced to $15.50, and the running time balance in his incremented by the second partial service use duration 720 (i.e., 90 minutes). The current running sum is therefore 210 minutes.

Continuing the example, the third time band 724 extends between time T_2 716 and time T_3 726. For the purposes of discussion below, is assumed that time T_3 726 is 10 p.m. The time rate applicable for the third time band 724 is $0.50/min. Accordingly the reverse rating program 318 determines the new maximum duration as $15.50/$0.50 =31 minutes.

At this point, the maximum duration extends the service use transaction until 7:01 p.m., which lies entirely within the third time band 724. Accordingly, no more segmenting is needed across additional time bands. Therefore, the reverse rating program 318 adds the newly determined maximum duration of 31 minutes as a partial service use duration to the previously determined partial service use durations 718 and 720. The resulting running time balance is 241 minutes, after which the current customer account balance would be $0.00.

In other words, given the time bands 710, 714, 724 defined in the example shown in FIG. 7, the time rates associated with the time bands 710, 714, 724, and the initial customer account balance of $50.00, the maximal service use duration is 241 minutes. The reverse rating program 318 may accordingly return a service authorization message to the mediation system. The service authorization message will specify that the maximal service use duration for the proposed service use transaction is 241 minutes.

Figure 8:
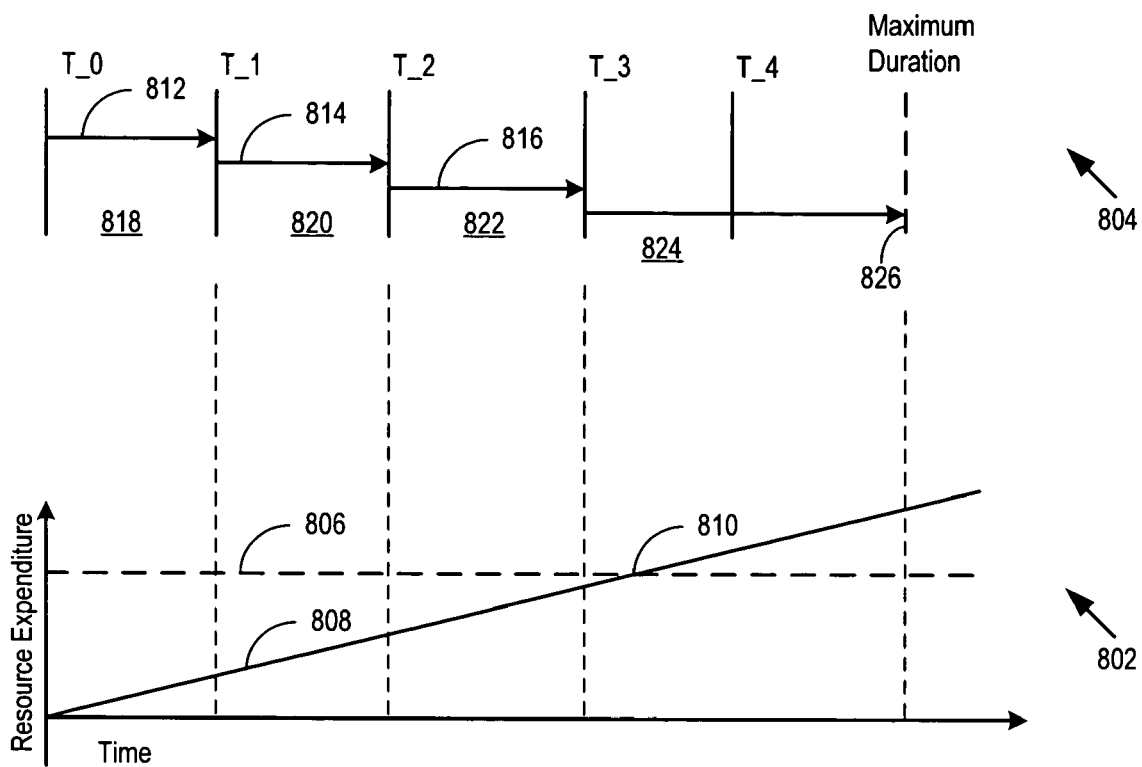
FIG. 8 shows a service use transaction divided across multiple time bands into partial service use durations.

FIG. 8 shows another example of a service use transaction divided across multiple time bands into partial service use durations. FIG. 8 shows a resource use graph 802 and a service use duration determination 804. These resource use graph 802 shows the resources expended over time to determine the reverse rating for proposed service use transaction. The resource use graph 802 shows where the resource use threshold 806 has been set, as well as the cumulative amount of resources expended 808. The cumulative amount of resources expended 808 crosses the resource use threshold 806 at point 810.

The service use duration determination 804 shows that the reverse rating program 318 has already identified three partial service use durations 812, 814, 816. The first partial service use duration 812 corresponds to the first time band 818. The second partial service use duration 814 corresponds to the second time band 820. The third partial service use duration 816 corresponds to the third time band 822.

In addition, the service use determination 804 shows that the maximum duration 826 extends over yet another fourth time band 824. However, at the point where the reverse rating program 318 would begin to segment the maximum duration 826 into a partial service use duration and a remainder, the reverse rating program 318 has exceeded its resource expenditure threshold 806. Accordingly, the reverse rating program 318 terminates instead of continuing its determination of the maximal service use duration. Instead, the reverse rating program 318 returns an approximation to the maximal service use duration. The approximation includes the running sum of the partial service use durations 812, 814, 816, as well as the newly determined maximum duration 826. The reverse rating program 318 then initiates transmission of the service authorization message including the approximation to the maximal service use duration.

Optionally, the reverse rating system 300 may consider costing rules such as scaling unit sizes, scaling rounding types, cost unit sizes, and cost rounding types during its calculations. Values may then be rounded in the direction specified by the scale rounding type to a multiple of the scale unit size. Options for scale rounding types include:

0=Truncate (round down)
1=Round to nearest
2=Round up.

For example, if the scale unit size is 10, the scale rounding type is 'nearest' and the value is 123, the new value is 120.

Because prices may be set per minute and the transaction duration may be expressed in units of seconds, the reverse rating system 300 may employ a scaling units divisor. The reverse rating system 300 thereby divides the original value by the divisor value to produce a value in the appropriate units for the rating.

The cost value may be rounded (in the direction specified by the cost rounding type) to a multiple of the cost unit size. Options for cost rounding types include:

0=Truncate (round down)
1=Round to nearest
2=Round up.

For example, if the cost unit size is 10, the cost rounding type is 'round up' and cost value is 191, the new value is 200.

Furthermore, the reverse rating system 300 may round the cost of any service unit transaction to the nearest 10th of a currency unit (e.g., one tenth of one U.S. cent or Euro cent).

In addition, the reverse rating system 300 may override any given time rate and instead apply an override time rate. To that end, the reverse rating system 300 may first assume that a default or base time rate applies. Alternatively, the base time rates may be established in a time rate diary table. The time rate diary table may define a cycle of base time rates (e.g., a weekly or monthly cycle). The reverse rating system 300 may also query a base time rate table which may define a cycle of times when the base time rate changes (e.g., to define a new time rate in any given time band).

The time rate diary table may also define a list of special dates and times on which different, override, time rates apply. The base time rate may be used unless there is an override time rate defined for a particular date/time. The reverse rating system 300 may then query an override time rate table which holds a list of date and time ranges and override time rates which should be applied.

In one implementation, the reverse rating system 300 determines an applicable time rate based on a customer product detail table, rating tariffs, cost code tables, and banding model tables. The customer product detail table may provide the rating tariff applicable to each product or service associated with a given customer. The rating tariff may provide a key into the rating tariff tables to identify a default cost band and a banding model identifier for the product or service.

Banding model tables group sets of related cost codes together into cost bands. The reverse rating system 300 searches for a cost band (and associated cost codes) in the banding model tables which match the banding model identifier. If no match is found, the reverse rating system 300 may use the default cost band specified in the rating tariff table.

Using the default or matched cost band and cost codes, the reverse rating system 300 may then consult the cost code tables. The cost code tables may specify a cost code identifier, a cost band identifier, a cost group identifier, an applicable start and end dates. Once the matching cost code is determined, the reverse rating system 300 may also consult the cost code tables to obtain a specified cost band identifier and group identifier for the cost code.

This specified cost band identifier indexes into a tariff basis table. The tariff basis table may define the application of tariff rules. For example, the tariff basis table may define combinations of costing rules and time rate diaries applicable for any combination of a cost band, transaction type and/or rating tariff. Accordingly, the reverse rating system 300 may follow the tariff basis table to an identified time rate diary. As noted above, the time rate diary may determine the time rate to be applied to the proposed service use transaction for any given product or service.

The reverse rating system 300 may express the reverse rating in terms of units other than time. The reverse rating system 300 also may determine the reverse rating for the proposed service use transaction in other manners. As one example, the reverse rating system 300 may forgo dividing the service use transaction into multiple time bands. Instead, the reverse rating system 300 may determine a maximum use duration assuming that the greatest time rate in any time band applies to all time bands, using the starting time rate (i.e., the time rate applicable at the beginning of the proposed service use transaction) for all time bands, using an average of the time rates across multiple time bands, or in other manners.

Figure 9:
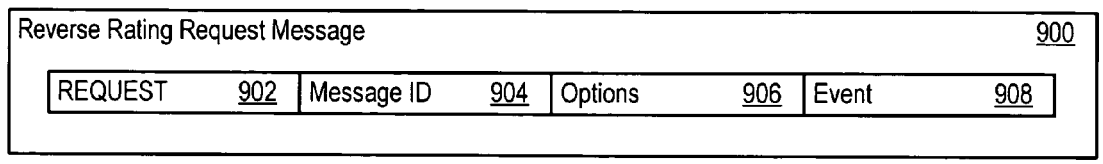
FIG. 9 illustrates a reverse rating REQUEST message.

FIG. 9 illustrates a reverse rating REQUEST message 900, which may be delivered in one or more TCP/IP packets to the reverse rating system 300. The reverse rating REQUEST message 900 includes a request identifier field 902, a message identifier field 904, and options field 906, and an event field 908. The request identifier field 902 includes a predefined bit pattern which identifies the REQUEST message 900 as a request for information. As examples, the REQUEST message may request a current account balance for a source identifier specified in the message 900, or may request whether an account exists for the source identifier.

The message identifier field 904 may provide a text string (e.g., 40 characters or less) which identifies a particular proposed service use transaction. The reverse rating system 300 may employ the same message identifier field 904 in each response to the REQUEST message 900. The options field 908 may provide a multiple digit (e.g., 3 digit) binary number which specifies processing options for the REQUEST message 900. The event field 908 may be a text field which provides an event data record specified as a comma separated set of values (in one implementation, up to 38 values).

An example of a REQUEST message is:

REQUEST,"270098401","000","1231231231","XX", "2005/04/04-17-01 -31.00",,,,,,,,,,,"INTERNATIONAL", "1231231231","001987654321",,"777900186","Rea lTimeRecordGeneratedByACS",,,,,,,,,,,,,,,,,.

The message identifier field 904 in this example is "270098401", and the options field 906 is set to "000". The remaining comma separated values in the message event field 908 provide information about the proposed service usage event. Examples include a source identifier (e.g., user login or MSISDN number), destination identifier (e.g., a called number or URL), volume of data to be transferred, duration of a call (e.g., the expected or desired duration), name of the content provider (e.g., "Internal" for events provided directly by the telecommunications service provider or "External" for events provided by other sources), and category of content which will appear on a bill (e.g., "TV-Show", "TV-Moive", "Sports", "News", or "Games"). Additional examples include detailed event descriptions, number of content events which the event record in the message refers to, calling IMSI, unique identifiers for the event record, transaction type, request timestamp, product or service identifiers, comments, identifiers for a type of VoIp connection (e.g., mobile-to-mobile or PC-to-PC) and/or other data.

Figure 10:
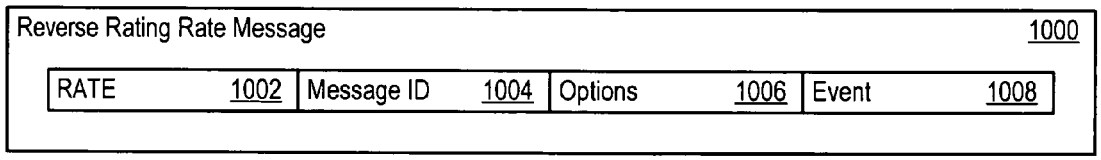
FIG. 10 shows a reverse rating RATE message.

FIG. 10 shows a reverse rating RATE message 1000. The RATE message 1000 may be used to request that the reverse rating system 300 determine a reverse rating for a proposed service use transaction identified in an event field. The RATE message 1000 includes a request identifier field 1002, a message identifier field 1004, and options field 1006, and an event field 1008. The request identifier field 1002 includes a predefined bit pattern which identifies the RATE message 1000 as a request for a reverse rating of a propose service use transaction.

The message identifier 1004 may be implemented as a text string (e.g., 40 characters or less) which identifies a particular proposed service use transaction. The reverse rating system 300 may employ the same message identifier field 1004 in each response to the RATE message 1000. The options field 1006 may provide a multiple digit (e.g., 3 digit) binary number which specifies processing options for the RATE message 1000. Bits in the options field 1006 may control whether the reverse rating. system returns duration information, whether to commit the event charge to the billing system, or whether to return a credit for the rated event, as examples. The event field 1008 may be a text field which provides an event data record as noted above specified as a comma separated set of values (in one implementation, up to 38 values).

An example of a RATE message is:

RATE,"270098301","110","1231231231","XX","2005/02/04-17-01-25.00",,"EUR",,,,,,,,,"INTERNATIONAL", "222014544556561","001987654321","400", "04544556561","RealTimeRecordGeneratedBy-ACS",,,,,,,,,,,,,,,,.

The message identifier field 1004 in this example is "270098301", and the options field 906 is set to "110" so that the event is rated and charged. The remaining comma separated values provide information about the proposed service usage event as noted above with regard to the message event field 908.

FIG. 11 shows a reverse rating NACK response message 1100. The NACK message 1100 includes a message definition field 1102, a message identifier field 1104, an error number field 1106, and an error message field 1108. The message definition field 1102 includes a predefined bit pattern which identifies the message 1100 as a NACK response. The message identifier field 1104 may provide a text field which corresponds to a message identifier field received in a reverse rating request message. The error number field 1106 provides a field in which the reverse rating system 300 stores an error number indicative of the error condition. Finally, the error message field 1108 provides a text field in which the reverse rating system 300 stores an error message. The reverse rating system 300 may send the NACK response message 1100 when a reverse rating request message does not meet an expected format, when a reverse rating request message cannot be parsed or does not include expected data, or when other errors occur.

An example of a REJECT message is:

NACK,"MSGID0001","01","Missing attributes".

The reverse rating system 300 may also send a acknowledgement message when any given message is correctly received and parsed:

ACK, "MSGID0001".

FIG. 12 shows a reverse rating REJECT response message 1200. The REJECT response message 1200 includes a message definition field 1202, a message identifier field 1204, an error number field 1206, and an error message field 1208. The message definition field 1202 includes a predefined bit pattern which identifies the message 1200 as a REJECT response. The message identifier field 1204 may provide a text field which corresponds to a message identifier field received in a reverse rating request message. The error number field 1206 provides a field in which the reverse rating system 300 stores an error number indicative of the error condition. Finally, the error message field 1208 provides a text field in which the reverse rating system 300 stores an error message. The reverse rating system 300 may send the REJECT response message 1200 when no customer account exists for the source identifier, when the current account balance is below the service threshold 324, or for other reasons for which the reverse rating system 300 should reject the service use transaction request.

An example of a REJECT message 1200 is:

REJECT,"MSGID0001","04","User has insufficient fund available".

FIG. 13 shows a reverse rating BALANCE response message 1300. The REJECT response message 1300 includes a message definition field 1302, a message identifier field 1304, and an event type field 1306. Additionally, the BALANCE response message 1300 includes an event source field 1308, a balance field 1310, and a balance time field 1312. The reverse rating system 300 may communicate the BALANCE response message 1300 to the mediation system when the customer account balance supports the pre-paid service use transaction.

The message definition field 1302 includes a predefined bit pattern which identifies the message 1300 as a BALANCE response. The message identifier field 1304 may provide a text field which corresponds to a message identifier field received in a reverse rating request message. The event type field 1306 provides a field in which the reverse rating system 300 stores a code indicating the type of service usage transaction (e.g., a code indicating a cellular phone call, or an Internet browsing session). The event source field 1308 provides a field in which the reverse rating system 300 may store a code indicting the source endpoint for the proposed service use transaction (e.g., a login for an Internet browsing session). The balance field 1310 may specify the customer account balance available for the service use transaction (e.g., the starting account balance). The balance time field 1312 may specify the reverse rating of the proposed service use transaction in terms of minutes, seconds, or other unit of measure.

An example of a BALANCE message 1300 is:
BALANCE,"MSGID0001","04",
"+393334444444","200","100.00".

FIG. 14 shows a reverse rating post-paid account response message.

The POST response message 1400 includes a message definition field 1402, a message identifier field 1404, an event type field 1406, and an event source field 1408. The reverse rating system 300 may communicate the POST response message 1400 to the mediation system when the customer account is a post-paid account. For pos-paid accounts, the service use transaction may be authorized by default.

The message definition field 1402 includes a predefined bit pattern which identifies the message 1400 as a POST response. The message identifier field 1404 provides a text field which conveys a message identifier field received in a reverse rating request message. The event type field 1406 provides a code indicating the type of service usage transaction (e.g., a code indicating a cellular phone call, or an Internet browsing session). The event source field 1408 provides a field which stores a code indicting the source endpoint for the proposed service use transaction (e.g., a login for an Internet browsing session, an IMSI number, or a cellular phone number).

An example of the POST message 1400 is:
POST,"MSGID0001","XX","+393334444444".

In general, any of the messages described above may take the form of XML messages with tagged data elements representing the data fields. Other message formats may be used, however. Furthermore, the event fields 908 and 1008 may incorporate a common message header. The header may be defined at the beginning of the event data records using one or more the comma separated value fields provided in the event records 908 and 1008. Table 1, below, provides an example of a header for the event records 908 and 1008 using the first 12 comma separated values in the event fields 908 and 1008.

TABLE 1

| Event Header | |
|---|---|
| Field | Description |
| Event Source | Provides the source of the event, such as a user login or phone number |
| Event Type | Identifies the event (e.g., an HTTP event, or VoIP event) |
| Event DTM | Provides the current start date and time |
| Cost Center | Provides an optional cost center number for the event to be allocated to |
| Currency Code | Identifier of the applicable currency, e.g., "EUR" |
| Event Cost | Provides the rated cost of the event (including any applied discounts). The cost may be specified in tenths of a smallest currency unit (e.g., in tenths of a cent) |
| Loyalty Points | Provides a loyalty point value of the event. This field may be left NULL if loyalty points are determined elsewhere |
| Competitor Cost | Provides a competitor's rated undiscounted cost of the event, if known |
| Internal Cost | Provides the internal cost of the event, e.g., the undiscounted price of an event. The cost may be specified in tenths of a cent |
| External Cost | Provides the buying-in price for the event. For telephony, for example, this provides the interconnect cost. For pay per view television, for example, this provides the price paid to the copyright owner |

TABLE 1-continued

| Event Header | |
|---|---|
| Field | Description |
| Tax Override Authorization Code | Determines the taxes applied to the event at bill time Provides an authorization code, if any, for the event |

Accordingly, the header may flexibly establish a useful set of header fields consistently across many event types. The remaining comma separated values in the message event field 908 may then provide information specific to a proposed service usage event (e.g., a VoIp even, HTTP browsing event, cellular phone call, or other event).

Thus, the reverse rating system 300 accurately and efficiently determines how long a service use transaction may continue. The reverse rating system 300 implements a flexible socket interface, with multi-threading support, which may process many hundreds or thousands of simultaneous reverse rating requests. The reserve rating determinations may take into consideration multiple time bands, and applicable discounts. Given the reverse rating of the proposed service use transaction, downstream processing systems may appropriately limit service use by pre-paid customers.

The reverse rating system 300 may also determine a reverse rating starting from a configurable percentage of the initial account balance. The reverse rating system 300 may thereby determine maximal use durations for concurrent accesses from different services associated to the same prepaid account. The reverse rating system 300 may also begin with a configurable percentage of the initial account balance even when the prepaid account is associated with only one product or service. To that end, the reverse rating parameters 322 may include a starting balance selection parameters which indicate the percentage of the initial account balance which will be used in the determination of the reverse rating for any given product or service.

The starting balance selection parameters may be chosen in any manner, such as through predicted, measured, or specifically allocated percentage of use between the services associated to the prepaid account. For example, measured or predicted usage (by time, cost, or other variable) may show that the prepaid account holder engages in cellular phone calls 75% of the time, and VoIp services 25% of the time. Alternatively, the prepaid customer may specifically allocate 75% of the account balance to cellular phone service and 25% of the account balance to VoIp service. The starting balance selection parameters may then establish that reverse rating the cellular phone calls will being with 75% of the initial account balance as the starting balance, while reverse rating for the VoIp service will begin with 25% of the initial account balance. Any other percentages for any number of products or services may be established by the reverse rating parameters 322.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for reverse rating a service use transaction, the method comprising:
   receiving through a communication interface a reverse rating rate message for a telecommunications service use transaction;

processing the reverse rating message to obtain a source identifier from the reverse rating rate message;

determining whether a customer account exists for the source identifier;

when no customer account exists, initiating transmission through the communication interface of a no-account rejection response; and when the customer account does exist:
establishing a resource expenditure threshold for determining a maximal duration of the telecommunications service use transaction;
initiating determination of multiple partial service use durations, each for a specific time band;
maintaining a sum of the multiple partial service use durations;
monitoring a resource expenditure as the multiple partial service use durations are determined;
comparing the resource expenditure against the resource expenditure threshold;
when the resource expenditure exceeds the resource expenditure threshold, returning the sum as an approximation to the maximal duration of the service use transaction; and,
when the resource expenditure does not exceed the resource expenditure threshold and there are no more partial service use durations to determine, returning the sum as the maximal duration of the service use transaction.

2. The method of claim 1, where the multiple partial service use durations are consecutive non-overlapping partial service use durations.

3. The method of claim 1, further comprising:
determining an account balance for the customer account; and
when the account balance is below a service threshold, initiate transmission of a no-balance rejection response.

4. The method of claim 1, further comprising:
determining whether the customer account is a post-paid account; and
when the customer account is a post-paid account, initiating transmission of an event authorization message without determining the maximal duration of the service use transaction.

5. The method of claim 1, further comprising:
determining an account balance for the customer account upon receipt of the reverse rating rate message; and
maintaining a current account balance while determining the multiple partial service use durations.

6. The method of claim 5, where determining multiple partial service use durations comprises:
determining multiple partial service use durations until the current account balance falls below a balance threshold.

7. The method of claim 1, where the resource expenditure threshold comprises a time threshold.

8. The method of claim 7, where the time threshold comprises a processor time threshold.

9. The method of claim 1, further comprising:
initiating execution of multiple reverse rating threads to process multiple reverse rating messages.

10. A product comprising:
a machine readable medium; and
instructions encoded on the medium for execution by a processor in a reverse rating system and which cause the reverse rating system to perform a method comprising:
processing a reverse message rating to obtain a source identifier associated with a service use transaction;
determining whether a customer account exists for the source identifier; and
when the customer account exists:
establishing a resource expenditure threshold for determining a maximal duration of the service use transaction;
initiating determination of multiple partial service use durations, each for a specific time band;
maintaining a sum of the multiple partial service use durations;
monitoring a resource expenditure as the multiple partial service use durations are determined;
comparing the resource expenditure against the resource expenditure threshold;
when the resource expenditure exceeds the resource expenditure threshold, returning the sum as an approximation to the maximal duration of the service use transaction; and,
when the resource expenditure does not exceed the resource expenditure threshold and there are no more partial service use durations to determine, returning the sum as the maximal duration of the service use transaction.

11. The product of claim 10, where the instructions further cause the reverse rating system to perform the method further comprising:
initiating execution of multiple reverse rating threads to process multiple reverse rating messages.

12. The product of claim 10, where the instructions further cause the reverse rating system to perform the method further comprising:
initiating transmission of a no-account rejection response when the customer account does not exist.

13. The product of claim 10, where the instructions further cause the reverse rating system to perform the method further comprising:
receiving a reverse rating rate message for a service use transaction; and
where the instructions which obtain the source identifier comprise instructions which obtain the source identifier from the reverse rating rate message.

14. The product of claim 10, where the instructions further cause the reverse rating system to perform the method further comprising:
determining an account balance for the customer account; and
when the account balance is below a service threshold, initiating transmission of a no-balance rejection response.

15. The product of claim 10, where the instructions further cause the reverse rating system to perform the method further comprising:
determining whether the customer account is a post-paid account; and
when the customer account is a post-paid account, initiating transmission of an event authorization message without determining the maximal duration of the service use transaction.

16. The product of claim 10, where the multiple partial service use durations form a service use continuum across multiple different time rates.

17. The product of claim 10, where the instructions further cause the reverse rating system to perform the method further comprising:
determining an initial account balance for the customer account; and maintaining a current account balance while determining the multiple partial service use durations.

18. The product of claim 17, where the instructions further cause the reverse rating system to perform the method further comprising:

determining the multiple partial service use durations until the current account balance falls below a balance threshold.

19. A reverse rating system for reverse rating a telecommunications service use transaction, the system comprising:

a communication interface that receives a reverse rating message for a telecommunications service use transaction;

memory storing reverse rating parameters; and, a processor that is operable to:

process the reverse rating message to extract a source identifier from the message;

determine whether a customer account exists for the source identifier;

when no customer account exists, initiate transmission through the interface of a no-account rejection response; and when the customer account does exist:

establish a resource expenditure threshold for determining a maximal duration of the telecommunications service use transaction as part of the reverse rating parameters;

initiate determination of multiple partial service use durations, each for a specific time band;

maintain a sum of the multiple partial service use durations;

monitor a resource expenditure threshold as the multiple partial service use durations are determined;

compare the resource expenditure against the resource expenditure threshold;

return the sum as an approximation to the maximal duration of the service use transaction when the resource expenditure exceeds the resource expenditure threshold; and return the sum as the maximal duration of the service use transaction when the resource expenditure does not exceed the resource expenditure threshold and there are no more partial service use durations to determine.

20. The reverse rating system of claim 19, where the processor is operable to initiate execution of multiple reverse rating threads to process multiple reverse rating messages.

21. The reverse rating system of claim 19, where the communication interface includes a rating socket comprising an IP address and port number.

22. The reverse rating system of claim 19, further comprising a memory storing a starting account balance and a starting time.

23. The reverse rating system of claim 22, where the multiple partial service use durations comprise a first partial service use duration is determined from the starting account balance, starting time, and an applicable time rate.

24. The reverse rating system of claim 19, where the processor is further operable to:

determine whether the customer account is a post-paid account; and when the customer account is a post-paid account, initiate transmission of an event authorization message without determining the maximal duration of the service use transaction.

25. The reverse rating system of claim 19, where the processor is further operable to:

maintain a current account balance for the customer account; and determine the multiple partial service use durations until the current account balance falls below a balance threshold.

* * * * *

UNITED STATES PATENT AND TRADEMARK OFFICE
CERTIFICATE OF CORRECTION

| | | |
|---|---|---|
| PATENT NO. | : 7,613,657 B2 | Page 1 of 1 |
| APPLICATION NO. | : 11/289895 | |
| DATED | : November 3, 2009 | |
| INVENTOR(S) | : Cesarini | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 564 days.

Signed and Sealed this

Fourteenth Day of June, 2011

David J. Kappos
*Director of the United States Patent and Trademark Office*